UNITED STATES PATENT OFFICE.

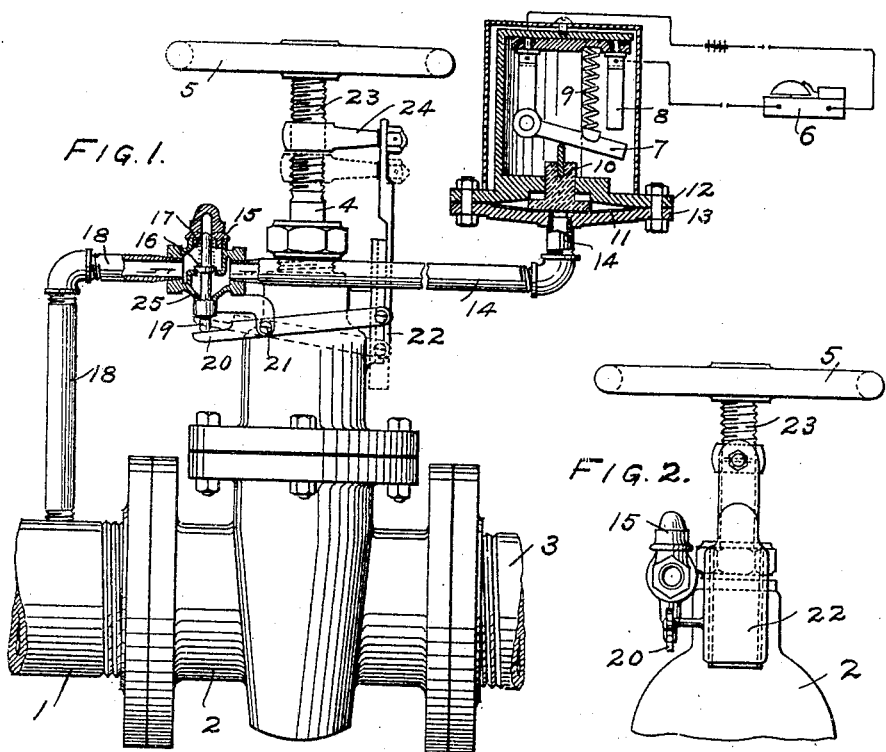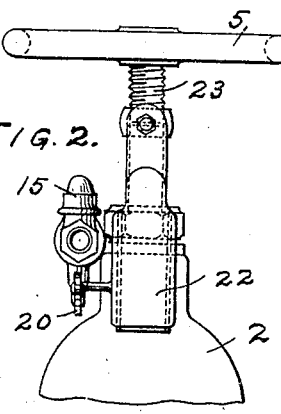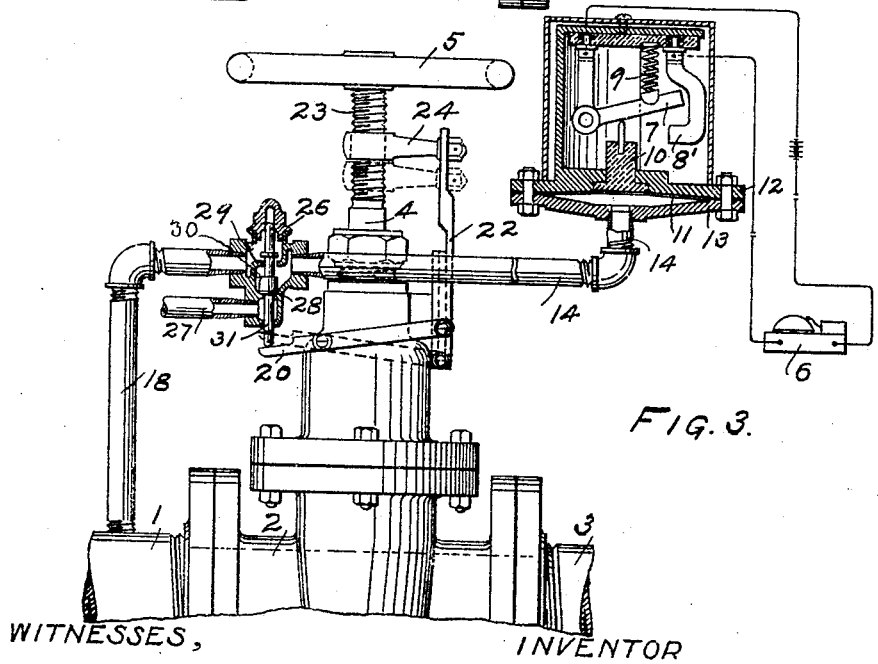

FREDERICK GRINNELL, OF NEW BEDFORD, MASSACHUSETTS, ASSIGNOR TO GENERAL FIRE EXTINGUISHER COMPANY, OF NEW YORK, N. Y., A CORPORATION OF NEW YORK.

VALVE APPARATUS.

No. 817,911.      Specification of Letters Patent.      Patented April 17, 1906.

Application filed July 11, 1899. Serial No. 723,516.

*To all whom it may concern:*

Be it known that I, FREDERICK GRINNELL, of New Bedford, county of Bristol, and State of Massachusetts, have invented certain new and useful Improvements in Valve Apparatus; and I do hereby declare the following specification, taken in connection with the accompanying drawings, forming a part of the same, to be a full, clear, and exact description thereof.

The invention relates to valves through which a fluid under pressure is supplied, and more especially to means for operating an indicator or alarm when said valve is closed or partially closed to shut off or reduce the effective supply of liquid.

The invention may be employed in connection with any suitable form of valve and in any desired relation, and is of especial advantage in fire sprinkler systems, where it is of great importance that the supply-valve shall not be unintentionally left closed or be closed by malicious persons without the fact that the valve is closed or has been tampered with being brought to the attention of the proper persons.

The object of the invention is to provde a simple and efficient means for indicating that the supply-valve is not in the proper condition for the passage therethrough of the proper amount of fluid; and to that end the invention consists in the features and combinations hereinafter described, and set forth in the claims.

In the accompanying drawings, Figure 1 is a view showing the supply-valve and means for controlling the operation of an indicator from said valve which embodies the present invention in one of its preferred forms. Fig. 2 is a partial view looking toward the left in Fig. 1, and Fig. 3 is a view showing a modified form of the invention.

Referring to the drawings in detail, the fluid is conducted from the source of supply through a pipe 1, which is connected to a supply-valve 2 of any ordinary form, and after passing through said valve is conducted through a pipe 3 to the sprinkler system or other place of distribution or use. The valve is provided with the usual operating rod or stem 4, which in the form of valve indicated has merely a motion of rotation in opening or closing the valve, and is provided with the usual operating-wheel 5. This valve, which is the ordinary "Chapman" valve, is merely shown for the purpose of illustration, and any other form of valve may be used—as, for instance, a valve in which the valve-stem moves longitudinally as well as rotating in opening or closing the valve.

In the present invention an indicator is located at any convenient place where it may be seen or heard by the proper person, and means are provided for operating the indicator, which means are controlled by the valve-operating mechanism, so that when said valve is closed or partially closed said indicator is operated. In the forms of the invention shown the pressure of the fluid in the supply-pipe is utilized in controlling or operating the indicator. The indicator may be of any suitable construction and may be directly operated by the fluid-pressure, if desired; but said pressure is preferably used to control the operation of the circuit-closer of an electrically-operated indicator.

In Fig. 1 an apparatus is shown in which the fluid-pressure controls the circuit-closer by furnishing the motive power for operating said circuit-closer, and said fluid-pressure is controlled by a valve operated from the supply-valve-operating mechanism. The indicator consists of an electric bell 6, which may be located at any suitable place—at a distance from the valve, if desired. A circuit-closing device is included in the circuit of said bell, which consists of a contact-blade 7, connected with one of the circuit-wires, and contact-plates 8, connected with the other circuit-wire. The blade 7 is held normally out of contact with the plates 8 by a spring 9 and is forced into contact with said plates to close the circuit by a plunger 10, arranged to be operated by fluid-pressure. The plunger 10 is mounted on a yielding diaphragm 11, held between two plates 12 and 13, the lower plate being provided with an opening communicating with a pipe 14 for supplying fluid under pressure to the under side of diaphragm 11. The pipe 14 leads from the outlet of a valve-casing 15, in which is mounted a valve 16, normally held to its seat by a spring 17. The valve-casing 15 is provided with an inlet connected by means of a pipe 18 with the supply-pipe 1. The valve 16 is provided with a stem 19, which passes through the casing 15 and is arranged to be operated by a lever 20, pivoted at 21 and having its end connected to a slide 22, mounted on a bracket on the valve-casing 2. The slide 22 is operated to rock lever 20, and thus open valve 16, by means of a screw-thread 23, formed on the valve-rod 4 and engaging a screw-thread in an arm 24, secured to the upper end of slide 22. When the rod 4 is turned to close the supply-valve, the screw-thread 23 moves the slide 22 down, thus rocking lever 20 into the dotted-line position, Fig. 1, and lifting valve 16 from its seat. This movement of valve 16 admits the fluid from supply-pipe 1 into pipe 14 and against the diaphragm 11, and the pressure of said fluid presses said diaphragm up into the recess in plate 12, thus forcing the blade 7 between plates 8, completing the electric circuit and operating bell 6. The devices for operating valve 16 are preferably so arranged that said valve is lifted to sound the alarm before the supply-valve is fully closed, as in sprinkler systems the partial closing of the supply-valve may cut off the water-supply to such an extent that the efficiency of the system is materially affected. When the supply-valve is opened, valve 16 returns to its seat, cutting off the fluid-supply to pipe 14, and the fluid in said pipe drains away through an opening 25 in valve-casing 15, allowing diaphragm 11 to return to its normal position when the spring breaks the indicator-circuit. The opening 25 also serves as a drip-opening for the escape of any fluid which may leak by the valve 15.

In Fig. 3 a modified form of apparatus is shown, in which the fluid-pressure controls the circuit-closer by preventing the operation of said closer until said pressure is reduced. In this case the diaphragm 11 is normally subjected to the action of fluid-pressure and the contact-blade and contact-plates are so arranged that when the diaphragm is forced into the recess in plate 12 the circuit is broken, and when the pressure on said diaphragm is removed the spring acts to complete the circuit to operate the indicator. The pipe 14 leads from the outlet of a valve-casing 26, the inlet-opening of which communicates with the supply-pipe 1 through the pipe 18. The valve-casing 26 is provided with a discharge-opening communicating with a discharge or drip pipe 27, which opening is normally closed by a valve 28. The casing is also provided with a partition 29, between the inlet and outlet openings in which is an opening adapted to be closed by a valve 30. The valves 28 and 30 are preferably in the form of a double valve secured to valve-stem 31, which extends beyond the casing and is arranged to be operated by a lever 20, as in the apparatus before described. When the supply-valve is open, valve 28 is closed and valve 30 is opened, leaving a free passage for the fluid from the supply-pipe to diaphragm 11, so that said diaphragm is held in the recess in plate 12 and the indicator-circuit is opened. When the valve-rod 4 is turned, however, to close the supply-valve, the valve-stem 31 is lifted, closing valve 30 and opening valve 28. This movement of the valves cuts off the communication with the supply-pipe 1 and allows the fluid in pipe 14 to escape through pipe 27, so that spring 9 may move the contact-blade 7 into engagement with the plates 8', thus completing the circuit and operating the indicator. When the supply-valve is opened, the pressure in the pipe 18 returns the valves 28 and 30 to their normal position, thus opening the communication between the supply and diaphragm 11 and closing the communication with the pipe 27.

What I claim as my invention, and desire to secure by Letters Patent, is—

1. The combination with a valve through which fluid is supplied, of an indicator controlled by fluid-pressure, and adjustable means for controlling said fluid-pressure from the mechanism for opening and closing the valve.

2. The combination with a valve through which fluid is supplied, of an indicator controlled by fluid-pressure, a valve for controlling said fluid-pressure, and adjustable means for operating said valve from the main-valve-operating means.

3. The combination with a supply-pipe and supply-valve, of an indicator, devices operated by fluid-pressure for controlling said indicator, a conduit from said devices to said supply-pipe, and a valve in said conduit adapted to be operated by the partial closing of the supply-valve.

4. The combination with a valve through which fluid is supplied, of pressure-controlled indicator mechanism, and a valve communicating between said mechanism and a fluid-supply and operated when the main valve is partially closed to reduce the supply of liquid therethrough.

5. The combination with a valve through which fluid is supplied, of a pressure-controlled indicator mechanism, a valve communicating between said mechanism and a fluid-supply, and adjustable devices for operating said valve from the mechanism for operating the main valve.

6. The combination with a valve through which fluid is supplied, of a pressure-operated indicator mechanism, a valve communicating between said mechanism and a fluid-supply, and adjustable means for opening said valve when the main valve is operated to reduce the supply of fluid therethrough.

7. The combination with a valve through which fluid is supplied, of a pressure-controlled indicator mechanism, a valve for controlling the pressure on said mechanism, a lever for operating said valve, and adjustable connections between said lever and the valve-rod of the main valve.

8. The combination with a valve through which fluid is supplied, of a pressure-operated indicator mechanism, a valve for controlling the pressure on said mechanism, a lever engaging the stem of said valve, and a slide connected with said lever and operated from the main valve-rod.

FREDERICK GRINNELL.

Witnesses:
R. A. BATES,
W. H. THURSTON.